United States Patent [19]

Maucher et al.

[11] 4,427,101
[45] Jan. 24, 1984

[54] FRICTION CLUTCH UNIT

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 250,381

[22] Filed: Apr. 2, 1981

[30] Foreign Application Priority Data

Apr. 5, 1980 [DE] Fed. Rep. of Germany ....... 3013299

[51] Int. Cl.³ .................... F16D 21/00; F16D 13/44
[52] U.S. Cl. .................................. 192/48.7; 74/572; 192/70.27; 192/89 B
[58] Field of Search ................... 192/48.7, 70.27, 89 B; 74/572; 123/179 J

[56] References Cited

U.S. PATENT DOCUMENTS

| | | | |
|---|---|---|---|
| 3,749,213 | 7/1973 | Maucher | 192/89 B X |
| 3,779,353 | 12/1973 | Mauscher | 192/89 B X |
| 4,317,435 | 3/1982 | Kohlhage | 192/89 B X |

*Primary Examiner*—Allan D. Herrmann
*Attorney, Agent, or Firm*—Kontler, Grimes & Battersby

[57] ABSTRACT

A friction clutch unit with two coaxial friction clutches the first of which has a first friction disc driven by the crankshaft of an internal combustion engine and disposed between an axially fixed and an axially movable pressure plate. The second clutch has a second friction disc which drives the input shaft of a change-speed transmission in the vehicle which embodies the engine and is disposed between an axially movable pressure plate and an axially fixed pressure plate. The axially fixed pressure plates of the two clutches are connected to each other by a rotary housing which defines a fulcrum for a common dished spring having an outer region bearing against projections provided on the axially movable pressure plate of the first clutch and an inner region bearing against projections provided on the axially movable pressure plate of the second clutch in engaged condition of the clutches. The bias of the common spring upon the axially movable pressure plate of the first clutch is assisted by a dished second spring which bears against the outer region of the common spring and reacts against an abutment forming part of the housing. The second clutch is disengaged ahead of the first clutch and the first clutch is reengaged ahead of the second clutch by an axially movable shifting plate which is connected with the common spring radially inwardly of the inner region of the common spring. The outer region of the common spring pivots relative to the axially movable pressure plate of the first clutch during disengagement of the second clutch and the common spring pivots relative to the fulcrum during disengagement of the first clutch.

43 Claims, 2 Drawing Figures

FRICTION CLUTCH UNIT

CROSS-REFERENCE TO RELATED CASE

A friction clutch unit which is identical with the friction clutch unit shown in FIG. 1 of the present application is disclosed in our commonly owned copending application Ser. No. 250,314 filed Apr. 2, 1981 for "Friction Clutch Assembly".

BACKGROUND OF THE INVENTION

The present invention relates to friction clutches in general, and more particularly to improvements in friction clutch assemblies or units with several coaxial friction clutches. Still more particularly, the invention relates to improvements in friction clutch units which can be utilized in automotive vehicles and wherein each of two coaxial friction clutches comprises a friction disc disposed between an axially movable and an axially fixed pressure plate and the axially movable pressure plates of both clutches can be biased against the respective friction discs by a common dished spring which is disposed between the two clutches.

Friction clutch units of the above outlined type are disclosed in German Offenlegungsschrift No. 27 55 994 corresponding to U.S. Pat. No. 4,210,232 granted July 1, 1980. A drawback of conventional friction clutch units with several coaxial friction clutches is that they are overly complex, bulky and expensive. Moreover, the actuating means for such clutches occupies too much space and comprises an excessive number of parts. Still further, the versatility of conventional friction clutch units is rather limited.

OBJECTS AND SUMMARY OF THE INVENTION

An object of the invention is to provide a friction clutch unit which is relatively simple, compact, rugged and inexpensive but its versatility nevertheless greatly exceeds that of presently known friction clutch units with several coaxial friction clutches.

Another object of the invention is to provide a novel and improved friction clutch unit which can be utilized in automotive vehicles to save energy and to enable the operator to control the engine with a minimum of effort and with minimal losses in time.

A further object of the invention is to provide the friction clutch unit with novel and improved means for actuating its friction clutches in a desired sequence.

An additional object of the invention is to provide a friction clutch unit wherein the magnitude of torque which is transmitted by the components of one of the clutches may but need not match the magnitude of torque which is transmitted by the other clutch or clutches.

A further object of the invention is to provide a friction clutch unit which can be utilized for the purposes outlined in German Offenlegungsschrift No. 27 48 697 corresponding to U.S. Pat. No. 4,252,208 granted Feb. 24, 1981.

An additional object of the invention is to provide the friction clutch unit with novel and improved means for stressing and confining the common spring.

Still another object of the invention is to provide the friction clutch unit with novel and improved means for assembling the pressure plates and other components of the coaxial friction clutches into a compact aggregate.

A further object of the invention is to provide a friction clutch unit wherein each of the friction clutches can transmit torque at a predictable rate so that the RPM of driven elements in engaged condition of the friction clutches depends exclusively on the RPM of the respective driving elements.

Another object of the invention is to provide a friction clutch unit wherein the axially movable pressure plate of one of the friction clutches can be biased against the respective friction disc or discs with a force greater than that which is exerted upon the axially movable pressure plate or plates of the other friction clutch or clutches without contributing to the bulk, cost and/or complexity of the unit.

A further object of the invention is to provide a friction clutch unit which embodies or forms part of the flywheel in an automotive vehicle or the like.

The invention is embodied in a friction clutch unit which comprises coaxial first and second friction clutches each of which includes an axially fixed rotary pressure plate, an axially movable rotary pressure plate and at least one rotary friction disc between the pressure plates, and a common dished spring which is interposed between the first and second clutches, as considered in the axial direction of the clutches. The spring has a first region which bears against the axially movable pressure plate of one of the clutches (e.g., against the axially movable pressure plate of the first clutch) and a second region which is disposed radially inwardly of the first region and bears against the axially movable pressure plate of the other clutch in engaged condition of the clutches. The spring has an annular portion between the first and second regions, and the clutch unit further comprises a fulcrum which defines a substantially annular seat for the just mentioned annular portion of the spring. The spring is pivotable with reference to the seat, at least during certain stages of actuation of the clutches. The fulcrum is preferably fixed, as considered in the axial direction of the clutches, and the seat defines with the annular portion of the spring a substantially annular clearance or gap in engaged condition of the clutches.

The spring can be said to form part of the means for actuating the clutches, and such actuating means further comprises a device (e.g., a plate mounted at one end of a reciprocable rod or bar) which is connected with the spring radially inwardly of the second region and is arranged to pivot the first region relative to the respective axially movable pressure plate to thereby reduce the clearance to zero and to simultaneously disengage the other clutch by relaxing the bias of the second region upon the corresponding axially movable pressure plate, and to thereupon pivot the annular portion of the spring relative to the seat to thereby reduce the bias of the first region upon the corresponding axially movable pressure plate with the resulting disengagement of the one clutch. During engagement of the clutches, the spring is pivoted in the reverse order, i.e., first relative to the seat and thereupon relative to the axially movable pressure plate of the one clutch.

The novel features which are considered as characteristic of the invention are set forth in particular in the appended claims. The improved friction clutch unit itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
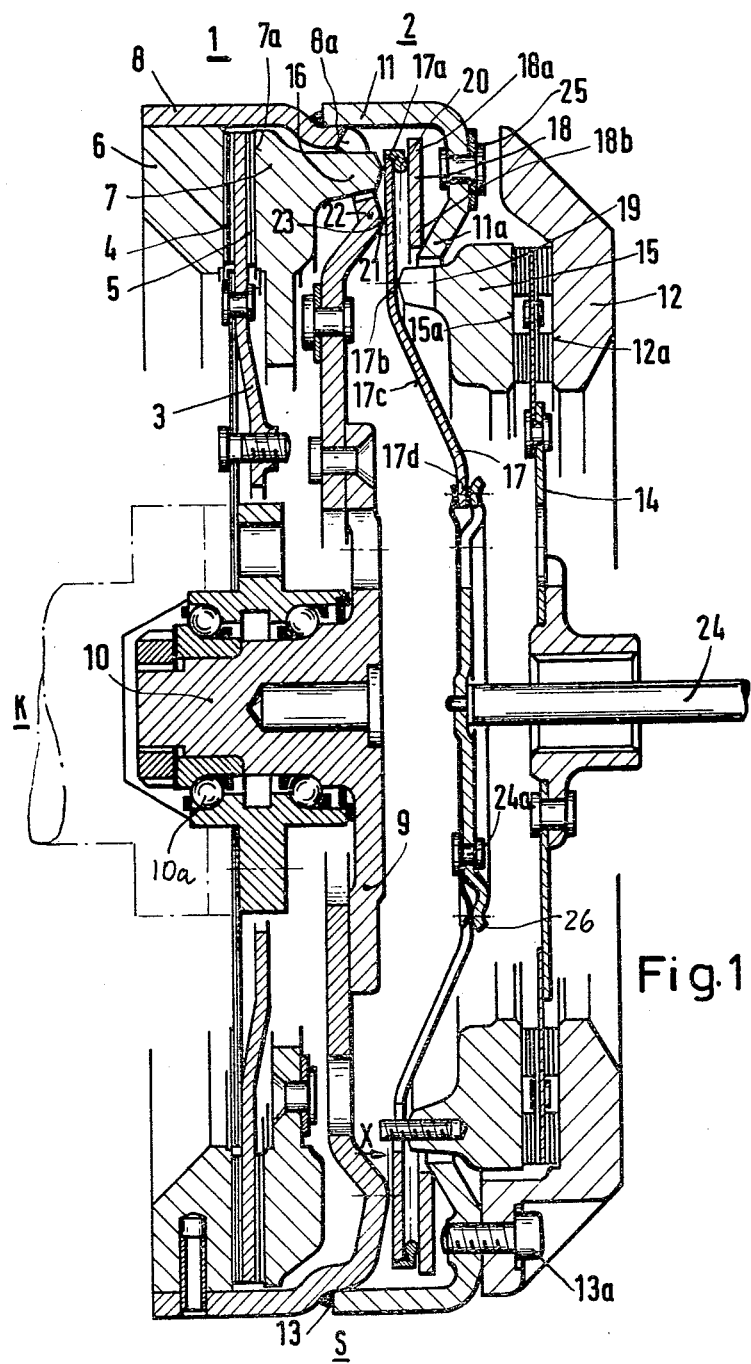
FIG. 1 is an axial sectional view of a first friction clutch unit which embodies one form of the invention and serves to establish or terminate a torque transmitting connection between the crankshaft of an internal combustion engine and a flywheel as well as between the flywheel and the input shaft of a change-speed transmission in the automotive vehicle which embodies the internal combustion engine.

Referring first to FIG. 1, there is shown a friction clutch assembly or unit including a first clutch 1 and a second clutch 2 which is coaxial with the first clutch. The reference character K denotes the crankshaft of an internal combustion engine which constitutes the rotary driving or input element of the first clutch 1 and serves to transmit torque to a flywheel S when the first clutch is engaged. The flywheel S can drive an output element (see the element 114 in FIG. 2) which may constitute the input shaft of a change-speed transmission of the type customarily used in a road vehicle, such as an automotive vehicle, which embodies the internal combustion engine including the crankshaft K. The flywheel S can rotate the input shaft of the change-speed transmission in response to engagement of the second clutch 2.

The crankshaft K drives a motion transmitting friction disc 3 which is directly connected to the crankshaft K and is provided with friction linings 4 and 5 at the opposite sides thereof. The lining 4 is adjacent to an axially fixed pressure plate 6 which forms part of the first clutch 1 and of the flywheel S, and the lining 5 is adjacent to an axially movable pressure plate 7 which also forms part of the first clutch and also constitutes one element of the aforementioned flywheel S. When the pressure plate 7 is biased in a direction to the left, as viewed in FIG. 1, so that it bears against the friction lining 5, the lining 4 is urged against the adjacent surface of the pressure plate 6 so that the friction disc 3 transmits torque to the pressure plates 6 and 7. The axially fixed pressure plate 6 of the first clutch 1 faces the internal combustion engine which includes the crankshaft K, and the pressure plate 7 faces the second clutch 2.

The axially fixed pressure plate 6 is connected with a cupped housing section 8 which confines the friction disc 3 and the axially movable pressure plate 7. The radially inwardly extending portion 8a of the cupped housing section 8 is connected to the flange 9 of a bearing pin 10 which is rotatably mounted in the right-hand end portion of the crankshaft K wherein it rotates within one or more antifriction bearings 10a. It will be noted that the housing section 8 is held against axial movement but is rotatable relative to the crankshaft K.

The housing or casing of the friction clutch assembly or unit shown in FIG. 1 further comprises a second cupped housing section 11 which partially overlies the right-hand portion of the housing section 8 and is welded thereto, as at 13. The second housing section 11 comprises radially inwardly extending portions 11a which carry a pressure plate 12 forming part of the second clutch 2. The means for separably or permanently securing the pressure plate 12, which is held against axial movement relative to the crankshaft K, to the portions 11a of the second housing section 11 comprises an annulus of screws 13a, rivets or analogous fasteners. The pressure plate 12 has a friction generating surface 12a facing toward the clutch 1 and toward the adjacent surface of a friction disc 14 forming part of the second clutch. The left-hand side of the friction disc 14 is adjacent to the friction generating surface 15a of an axially movable pressure plate 15 forming part of the second clutch 2. The friction generating surface 15a of the pressure plate 15 faces away from the friction generating surface 7a of the pressure plate 7 forming part of the first clutch 1.

The axially movable pressure plate 7 of the first clutch 1 comprises an annulus of projections or lobes 16 which extend through complementary cutouts or openings defined by the radially inwardly extending portion 8a of the housing section 8. The tips of the projections 16 are normally contacted by a dished first clutch spring 17 which is common to the clutches 1, 2 and is interposed, in prestressed condition, between the housing section 8 and a dished second clutch spring 18. The first clutch spring 17 has a radially outermost portion or region 17a normally engaging the projections 16 of the pressure plate 7. Thus, when the first clutch 1 is engaged, the portion or region 17a of the common dished spring 17 urges the pressure plate 7 against the friction disc 3 which, in turn, is urged against the axially fixed pressure plate 6 so that the parts 6, 3, 7, 8, 11 and 17 rotate as a unit at the angular velocity of the crankshaft K as long as the first clutch 1 remains engaged.

The pressure plate 15 of the second clutch 2 has an annulus of discrete projections or lobes 19 which extend in a direction to the left through the central opening of the second clutch spring 18 and engage a region or portion 17b of the first clutch spring 17. The region 17b is located radially inwardly of the outermost region 17a which normally engages the projections 16 of the pressure plate 7. In this manner, the dished clutch spring 17 is maintained in tensioned condition between the pressure plates 7 and 15. Consequently, the spring 17 biases the pressure plate 15 in a direction to the right, as viewed in FIG. 1, so that the pressure plate 15 urges the friction disc 14 against the pressure plate 12 to thereby maintain the second clutch 2 in engaged condition.

The second clutch spring 18 comprises a radially outermost portion or region 18a which abuts against a ring-shaped seat 20 interposed between the region 18a and the region 17a of the first clutch spring 17. The seat 20 can be said to form part of the spring 17. Furthermore, the second clutch spring 18 comprises a radially innermost portion or region 18b which abuts against the radially inwardly extending portion 11a of the second housing section 11. The second housing section 11, which is connected with the first housing section 8, surrounds or confines the clutch springs 17 and 18. The portion 11a constitutes an axially fixed abutment for the region 18a; this abutment is located radially inwardly of the region 17a.

The first clutch spring 17 can abut against a ring-shaped seat 21 which is disposed between the regions 17a and 17b and is defined by a circumferentially complete annular bead 22 of the radially inwardly extending portion 8a of the housing section 8. In other words, the seat 21 is disposed between the annuli of projections 16 and 19, as considered in the radial direction of the clutches 1 and 2. The seat 21 is adjacent to that side or surface (17c) of the first clutch spring 17 which faces away from the second clutch spring 18 and toward the first clutch 1. The reference character X denotes a relatively narrow clearance or gap between the seat 21 and the side or surface 17c of the clutch spring 17 when the clutches 1 and 2 are engaged in a manner as shown in FIG. 1. The housing section 8 may constitute a metallic stamping and the bead 22 can be formed by appropriate deformation of the portion 8a which extends radially inwardly toward and is connected to the aforementioned flange 9 of the bearing pin 10. That annular portion of the surface 17c on the first clutch spring 17 which contacts the bead 22 when the spring 17 is deformed so as to reduce the width of the clearance X to zero is denoted by the reference character 23. The portion 23 can be called a rolling portion of the surface 17c, and the portion 8a of the housing section 8 constitutes an axially fixed fulcrum for the annular portion 17c during certain stages of operation of the actuating (engaging and disengaging) means for the clutches 1 and 2. The portion 8a may consist of sheet metal so that the bead 22 can be readily formed therein by resorting to conventional deforming techniques.

The actuating means for engaging or disengaging the clutches 1 and 2 comprises the spring 17 and further comprises a pressure transmitting member here shown as a bar or rod 24 which is coaxial with the crankshaft K and the left-hand end portion of which is secured to a disengaging or shifting plate 24a having a marginal portion 26 secured to the radially innermost portion 17d of the first clutch plate 17. The marginal portion 26 is connected to the innermost portion 17d of the first clutch spring 17 by rivets or other suitable fastener means.

When the member 24 is shifted axially in a direction to the left, as viewed in FIG. 1, the shifting plate 24a causes the first clutch spring 17 to pivot with its radially outermost region 17a relative to the annulus of projections 16 so that the prestressed spring 17 acts not unlike a one-armed lever and thereby moves its region 17b away from the projections 19 of the axially movable pressure plate 15. Consequently, the pressure plate 15 is free to move axially so that the frictional engagement between this pressure plate 15 and the friction disc 14 is terminated and the clutch 2 including the pressure plates 12, 15 and friction disc 14 is disengaged ahead of the clutch 1.

As the member 24 continues to move in a direction to the left, the shifting plate 24a causes the first clutch spring 17 to reduce the distance between the seat 21 and the side or surface 17c to zero (i.e., the clearance X disappears) whereupon the annular surface portion 23 rolls along the seat 21 which is defined by the bead 22 of the fulcrum 8a and the clutch spring 17 behaves not unlike a two-armed lever which pivots at 21 to thereby move its outermost region 17a away from the annulus of projections 16. Consequently, the axially movable pressure plate 7 can move away from the friction disc 3 and the clutch 1 is disengaged. The radially outermost region 17a moves the radially outermost region 18a with it, i.e., in a direction to the right, as viewed in FIG. 1, so that the clutch spring 18 ceases to indirectly bias the pressure plate 7 toward the pressure plate 6.

In order to reengage the clutches 1 and 2, the member 24 is moved in a direction to the right, as viewed in FIG. 1, whereby the prestressed dished clutch spring 17 pivots about the seat 21 in the opposite direction and moves its radially outermost region 17a toward the projections 16 of the pressure plate 7 which is thereby biased against the lining 5 of the friction disc 3 which moves its lining 4 into requisite frictional engagement with the axially fixed pressure plate 6. The bias of the outermost region 17a of the clutch spring 17 against the projections 16 is assisted by the outermost region 18a of the second clutch spring 18. As the member 24 continues to move in a direction to the right, as viewed in FIG. 1, the surface 17c of the first spring 17 moves away from the seat 21 so that the clearance X is reestablished before the region 17b of the clutch spring 17 begins to bear against the projections 19 and thereby urges the axially movable pressure plate 15 of the second clutch 2 against the friction disc 14 which, in turn, bears against the axially fixed pressure plate 12.

The reference character 25 denotes in FIG. 1 one of several circumferentially distributed leaf springs or analogous connecting or coupling elements which connect the second housing section 11 with the axially movable pressure plate 15 of the second clutch 2. The leaf springs 25 enable the pressure plate 15 to move axially of the crankshaft K but hold this pressure plate against any angular displacement with reference to the housing sections 8 and 11. These leaf springs are accommodated in the space between the right-hand side of the second housing section 11 and the left-hand side of the axially fixed pressure plate 12 forming part of the second clutch 2.

It will be noted that, during engagement or disengagement of the clutches 1 and 2, the common dished spring 17 behaves not unlike a lever whose (first) lever arm or transmission ratio during pivoting of the region 17a relative to the annulus of projections 16 is different from (larger than) the (second) lever arm or transmission ratio during pivoting of the portion 23 relative to the seat 21. The lever arms can be readily selected in such a way that the force which is required to disengage the clutch 1 need not appreciably exceed the disengaging force for the clutch 2 even though the projections 16 are biased by both dished springs. The first lever arm is preferably in the order of 2–5 and the second lever arm is then in the order of 4–6.

The friction clutch unit of FIG. 1 is susceptible of many modifications without departing from the spirit of the invention. For example, the common spring 17 need not be installed between the clutches 1 and 2 in prestressed condition; instead, the spring 17 can be connected to a discrete energy storing device which biases the regions 17a and 17b against the respective annuli of projections 16 and 19 in engaged condition of the clutches 1 and 2. It is further possible to design and mount the spring 17 in such a way that it contacts the fulcrum 8a in engaged condition of the two clutches. The arrangement which is shown in FIG. 1 is preferred at this time, especially if the spring 17 is constructed and mounted in such a way that its innate force suffices to bias the projections 16 and 19 in engaged condition of the two clutches so that the friction disc 3 can rotate the pressure plates 6, 7 and the pressure plates 12, 15 can rotate the friction disc 14. When the shifting plate 24a is moved in a direction toward the crankshaft K to disengage the clutches 2 and 1 in such order, the plate 24a bears against the portion or portions 17d radially inwardly of the region 17b to deform the spring 17 and to cause it to move the region 17b away from the axially fixed pressure plate 12, to thereupon (or simultaneously) reduce the clearance X to zero, and to thereupon reduce the bias upon the projections 16, i.e., to disengage the clutch 2 ahead of the clutch 1. The common axis of the shifting plate 24a and member 24 coincides with the common axis of the clutches 1 and 2. As mentioned above, the first clutch 1 can be actuated to transmit torque from the crankshaft K of the internal combustion engine of a motor vehicle to the flywheel S, and the second clutch 2 can be actuated to transmit torque from the flywheel S to the input shaft of a change-speed transmission in the motor vehicle.

An important advantage of the improved clutch unit is that only a single actuating means is necessary to engage or disengage the clutches 1 and 2. The common spring 17 (i.e., that element of the friction clutch unit which biases the projections 16 and 19 in engaged condition of the clutches 1 and 2) can be said to constitute a component part of the single actuating means. The provision of single actuating means, all component parts of which are coaxial with each other, brings about the additional advantage that each and every element of the clutch unit has an axis which coincides with the common axis of the clutches 1 and 2. This ensures that the clutch unit can transmit torque at a highly and accurately reproducible RPM. Moreover, the provision of a single actuating means contributes to simplicity, compactness, lower cost and ruggedness of the improved clutch unit.

The spring 18 can be replaced with or composed of two or more springs without departing from the spirit of the invention. It is also clear that the friction disc 3 and/or 14 can be replaced with a package of discs. For example, the spring 18 can be replaced with an annulus of coil springs which react against the abutment 11a and bear against the region 17a of the dished spring 17. The utilization of additional biasing means which comprises one or more dished springs is preferred at this time. In contrast to the illustrated embodiment wherein the region 18b of the second dished spring 18 bears against the abutment means 11a radially inwardly of the region 17a of the common dished spring 17, the abutment means for the region 18b of the spring 18 can be disposed radially outwardly of the region 17a. The structure which is shown in FIG. 1 is preferred at this time because it contributes to compactness of the friction clutch unit.

FIG. 1 shows the components of the improved clutch unit in the presently preferred order, as considered in the axial direction of the clutches. Thus, the axially fixed pressure plate 6 of the first clutch 1 is followed by the friction disc 3, the latter is followed by the axially movable pressure plate 7 of the clutch 1, the pressure plate 7 is followed by the radially inwardly extending portion of fulcrum 8a of the housing section 8 which is rotatable with the bearing pin 10 (i.e., relative to the crankshaft K), the portion 8a is followed by the common dished spring 17 which bears against the axially movable pressure plates 7 and 15 of the two clutches, the spring 17 is followed by the second dished spring 18 which bears against the spring 17 and the abutment means 11a, the spring 18 is followed by the axially movable pressure plate 15 of the second clutch 2, the pressure plate 15 is followed by the friction disc 14, and the friction disc 14 is followed by the axially fixed pressure plate 12 of the second clutch 2.

The bead 22 may constitute a single circumferentially complete body or it may consist of several arcuate beads.

The ring-shaped seat 20 for the second spring 18 is a desirable but optional feature of the improved friction clutch unit.

Figure 2:
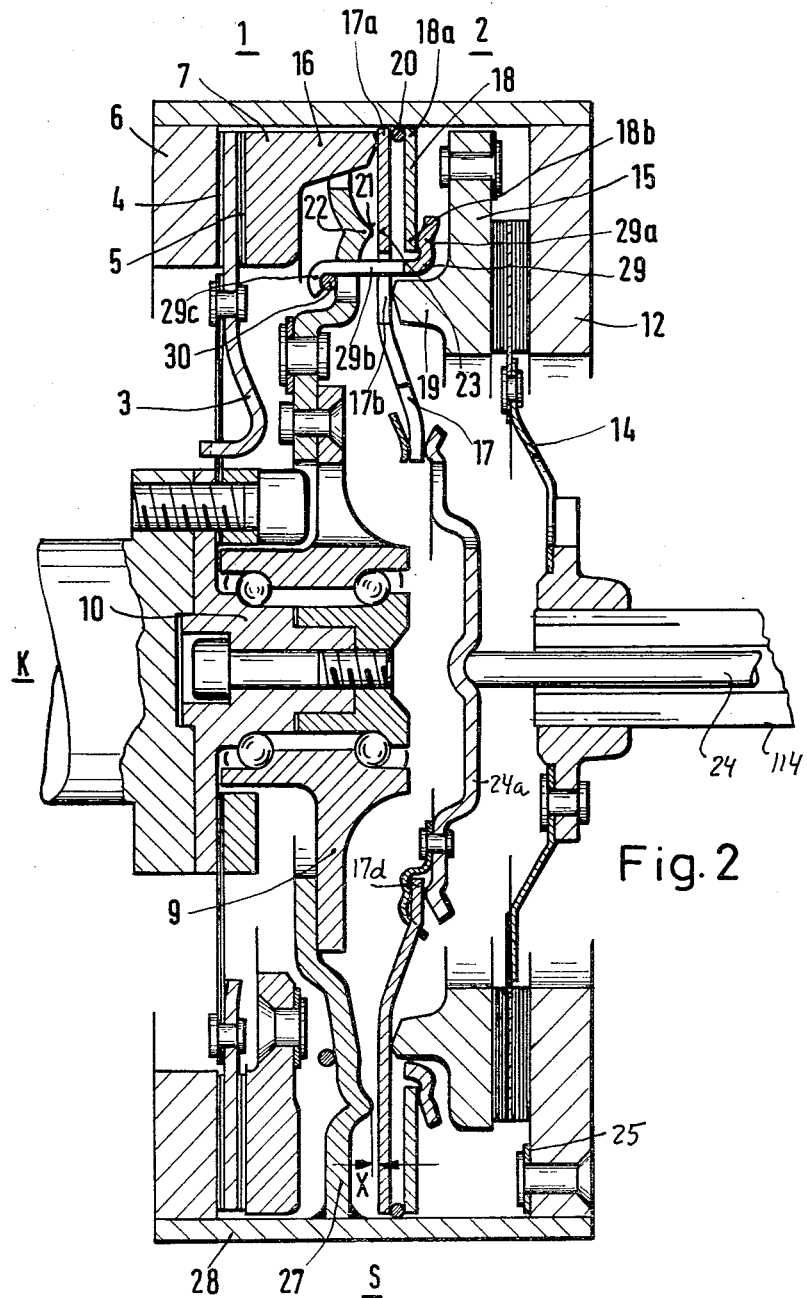
FIG. 2 is a similar axial sectional view of a modified friction clutch unit with two coaxial friction clutches.

FIG. 2 shows a second friction clutch unit whose operation is based on the same principle as that of the clutch unit shown in FIG. 1 but which is of a modified design. Those component parts of the second friction clutch unit which are identical with or clearly analogous to corresponding parts of the friction clutch unit shown in FIG. 1 are denoted by similar reference characters.

The first friction clutch 1 of FIG. 2 serves to establish or terminate a torque transmitting connection between a rotary driving element K which constitutes the crankshaft of an internal combustion engine and a first rotary driven element S which is coaxial with the crankshaft K and constitutes or can constitute the flywheel of the automotive vehicle which embodies the internal combustion engine. The second friction clutch 2 of the unit shown in FIG. 2 can establish or terminate a torque transmitting connection between the flywheel S and a second rotary driven element 114 which constitutes or may constitute the input shaft of a change-speed transmission in the aforementioned vehicle.

The first friction clutch 1 comprises a friction disc 3 having two friction linings 4, 5, an axially fixed pressure plate 6, and an axially movable pressure plate 7. The bearing pin or stub 10 which is rotatably mounted in the right-hand end portion but does not move axially of the crankshaft K is provided with a flange 9 which is separably or permanently connected to a radially inwardly extending portion 27 of a cylindrical housing section 28 which is rigid with the axially fixed pressure plate 6 of the first friction clutch 1. The housing section 28 extends all the way to the left-hand side of the pressure plate 6 as well as beyond the right-hand side of the portion 27 and is rigidly connected with the axially fixed pressure plate 12 of the second friction clutch 2.

The first dished spring 17 of the common actuating means for the clutches 1 and 2 includes a radially outermost portion or region 17a which normally bears against the annulus of projections or lobes 16 forming part of the axially movable pressure plate 7 of the first friction clutch 1 and extending through suitable openings or cutouts provided therefor in the portion 27 of the housing section 28. A second portion or region 17b of the dished spring 17 is located radially inwardly of the region 17a and normally bears against the annulus of projections or lobes 19 forming part of the axially movable pressure plate 15 of the second friction clutch 2. When the first clutch 1 is engaged, the pressure plate 7 bears against the friction lining 5 of the friction disc 3 and urges the friction lining 4 against the adjacent friction generating surface of the pressure plate 6 so that the disc 3 drives the pressure plates 6 and 7 because it is directly connected with the rotating crankshaft K of the internal combustion engine. If the second clutch 2 is also engaged, the region 17b of the dished spring 17 urges the pressure plate 15 against the respective lining of the friction disc 14 which bears against the pressure plate 12. The pressure plate 12 rotates with the housing section 28 when the clutch 1 is engaged so that the pressure plate 12 drives the friction disc 14 which, in turn, is directly connected to and drives the input shaft 114 of the transmission.

The pressure plate 7 of the first friction clutch 1 is further biased by a second dished spring 18. The radially outermost portion or region 18a of the dished spring 18 bears against a ring-shaped seat 20 which, in turn, bears against the radially outermost region 17a of the first or common dished spring 17. The radially innermost portion or region 18b of the second dished spring 18 abuts against an axially fixed housing section 29, namely against a radially outwardly extending ring-shaped outer marginal portion 29a of the section 29. The portion 29a is outwardly adjacent to axially extending portions 29b of the housing section 29. The portions 29b extend through suitable openings or cutouts provided therefor in the dished spring 17 and the section 29 further comprises radially inwardly extending portions 29c which are held by the portion 27 so that they cannot move axially. At the very least, the engagement between the portions 29c and the portion 27 is such that the section 29 cannot move in a direction to the right, as viewed in FIG. 2, i.e., that the section 29 cannot yield to the bias of the radially innermost region 18b of the second dished spring 18. The section 29 constitutes an axially fixed abutment for the region 18b. The portion 27 has openings or cutouts for the portions 29b of the section 29 and the portions 29c constitute or resemble hooks or claws which indirectly engage the left-hand side of the portion 27 through the medium of a ring-shaped insert 30. The portion 29a of the housing section 29 defines a seat or abutment in the form of a bead whose apex contacts the region 18b of the dished spring 18.

The seat 21 for the annular surface portion 23 of the dished spring 17 is defined by the portion 27 of the housing section 28. The reference character 22 again denotes a bead which forms part of the portion 27 and defines the seat 21. The portion 27 constitutes an axially fixed fulcrum for the spring 17. The seat 21 is again disposed between the regions 17a and 17b of the first dished spring 17. When the clutches 1 and 2 are engaged, the portion 17c of the spring 17 defines with the seat 21 a clearance or gap X which is reduced to zero during operation of the actuating means, i.e., when the radially innermost portion 17d of the spring 17 is moved axially of and toward the crankshaft K by the plate-like shifting member 24a of the actuating means which latter further includes the member 24. The member 24 is movable axially of the clutches 1, 2 and extends through the axial bore of the input shaft 114. Reduction of the clearance X to zero is preceded by pivoting of the region 17a with reference to the annulus of projections 16 so as to disengage the clutch 2 by reducing the bias of the region 17b against the projections 19 of the axially movable pressure plate 15. When the portion 17d of the spring 17 continues to move toward the crankshaft K, the clearance X is reduced to zero preparatory to pivoting or rolling of the annular portion 23 along the seat 21 in order to move the region 17a (and hence also the region 18a) away from the axially fixed pressure plate 6 and to thus relax the pressure against the projections 16 of the axially movable pressure plate 7. It will be noted that the mode of operation of the clutches 1 and 2 in the friction clutch unit of FIG. 2 is clearly analogous to the mode of operation of the first friction clutch unit which is shown in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A friction clutch unit, comprising coaxial first and second friction clutches each of which includes an axially fixed rotary pressure plate, an axially movable rotary pressure plate and a rotary friction disc between said pressure plates; a common clutch spring interposed between said clutches, as considered in the axial direction of the clutches, said spring having a first region bearing against the axially movable pressure plate of one of said clutches and a second region disposed radially inwardly of said first region and bearing against the axially movable pressure plate of the other of said clutches in engaged condition of such clutches, said spring further having a portion disposed intermediate said first and second regions; and a fulcrum defining a substantially annular seat for said portion of said spring, said spring being pivotable with reference to said seat.

2. The unit of claim 1, wherein said fulcrum is fixed, as considered in the axial direction of said clutches, said portion of said spring and said seat defining a clearance in the engaged condition of said clutches.

3. The unit of claim 1, wherein said spring has a first side facing one of said clutches and a second side facing the other of said clutches, said fulcrum being adjacent to one of said sides.

4. The unit of claim 3, wherein said one side of said spring faces the axially movable pressure plate which is engaged by said first region.

5. The unit of claim 1, further comprising means for disengaging said clutches, including a device arranged to engage said spring radially inwardly of said second region and to move said spring axially of said clutches in a direction to reduce the bias of one of said regions against the respective axially movable pressure plate.

6. The unit of claim 5, wherein said spring is installed between said clutches in prestressed condition so that said regions thereof normally bear against the respective axially movable pressure plates.

7. The unit of claim 5, wherein said one region is said second region and said device is arranged to reduce the width of said clearance to zero subsequent to said reduction of bias of said second region upon the respective axially movable pressure plate and to thereupon pivot said portion of said spring relative to said fulcrum in a direction to reduce the bias of said first region upon the respective axially movable pressure plate.

8. The unit of claim 7, further comprising additional means for biasing that axially movable pressure plate which is biased by said first region in engaged condition of the respective clutch.

9. The unit of claim 8, wherein said additional biasing means comprises at least one further spring.

10. The unit of claim 9, wherein said further spring is a second dished spring.

11. The unit of claim 10, wherein said second dished spring is arranged to bias that axially movable pressure plate which is biased by the first region of said common spring by way of said first region in engaged condition of the respective clutch.

12. The unit of claim 11, wherein said common spring includes a seat for said second spring.

13. The unit of claim 10, further comprising housing means defining an abutment for said second spring, said abutment being located radially outwardly of said first region of said common spring.

14. The unit of claim 13, wherein said abutment is fixed, as considered in the axial direction of said clutches.

15. The unit of claim 10, further comprising housing means defining an abutment for said second spring, said abutment being located radially inwardly of said first region of said common spring.

16. The unit of claim 15, wherein said abutment is fixed, as considered in the axial direction of said clutches.

17. The unit of claim 8, wherein said additional biasing means applies a force only against that axially movable pressure plate which is biased by said first region of said common spring in engaged condition of the respective clutch, the other axially movable pressure plate being biased solely by the second region of said common spring in engaged condition of the clutch including said last mentioned axially movable pressure plate.

18. The unit of claim 17, wherein said portion of said common spring and said seat define a clearance in engaged condition of said clutches and further comprising means for disengaging said clutches including a device arranged to engage said common spring radially inwardly of said second region and to pivot said first region relative to the corresponding axially movable pressure plate to thereby reduce the bias of said second region upon the corresponding axially movable pressure plate and to reduce the width of said clearance to zero, and to thereupon pivot said portion of said common spring about said seat in a direction to reduce the bias of said first region upon the corresponding axially movable pressure plate and to simultaneously reduce the force which said additional biasing means applies to the last mentioned axially movable pressure plate.

19. The unit of claim 18, wherein said device is movable in a first direction to disengage said clutches and in a second direction to engage said clutches, the movement in said second direction entailing pivotal movement of said portion of said common spring about said seat in a direction to increase the bias of said first region and of said additional biasing means upon the respective axially movable pressure plate, reestablishment of said clearance and ensuing pivoting of said first region relative to the corresponding axially movable pressure plate to increase the bias of said second region upon the respective axially movable pressure plate.

20. The unit of claim 1, wherein said portion of said spring and said seat define a clearance in engaged condition of said clutches, said spring further having a second portion located radially inwardly of said second region and further comprising means for engaging and disengaging said clutches including a device for moving said second portion of said spring axially of said clutches in a direction to reduce said clearance to zero while pivoting said first region relative to the respective axially movable pressure plate during disengagement of one of said clutches and to thereupon pivot said first named portion of said spring relative to said seat during disengagement of the other of said clutches, said spring having a first lever arm during pivoting of said first region relative to the respective axially movable pressure plate and a different second lever arm during pivoting of said first named portion relative to said seat.

21. The unit of claim 1, further comprising a crankshaft forming part of an internal combustion engine and drivingly connected with the friction disc of said first clutch, a second shaft forming part of a change-speed transmission and connected to and receiving torgue from the friction disc of said second clutch, and a flywheel including at least one of said pressure plates.

22. The unit of claim 1, further comprising means for effecting disengagement of said second clutch ahead of said first clutch.

23. The unit of claim 1, further comprising a second dished spring arranged to bias the axially movable pressure plate of said first clutch against the respective friction disc in engaged condition of said first clutch, and axially fixed abutment means for said second spring, said fulcrum being disposed between the axially movable pressure plate of said first clutch and said common spring, said second spring being disposed between said common spring and said abutment means, and said abutment means being disposed between said second spring and the axially movable pressure plate of said second clutch, as considered in the axial direction of said clutches.

24. The unit of claim 23, further comprising a rotary housing, said fulcrum and said abutment means forming part of said housing.

25. The unit of claim 24, further comprising a crankshaft forming part of an internal combustion engine and drivingly connected with the friction disc of said first clutch and an input shaft forming part of a change-speed transmission, said input shaft being connected to and receiving torque from the friction disc of said second clutch.

26. The unit of claim 25, further comprising bearing means rotatably mounting said housing in said crankshaft.

27. The unit of claim 26, wherein said housing comprises a cupped section confining the axially movable pressure plate and the friction disc of said first clutch, said fulcrum having an annulus of openings and the axially movable pressure plate of said first clutch having an annulus of projections extending through said openings and being engaged by said first region of said common spring in engaged condition of said first clutch.

28. The unit of claim 27, wherein said cupped section is rigid with the axially fixed pressure plate of said first clutch.

29. The unit of claim 27, wherein said fulcrum is rigid with said cupped section.

30. The unit of claim 29, wherein said fulcrum consists of sheet metal and includes an annular bead which defines said seat.

31. The unit of claim 27, wherein said housing further comprises a second cupped section which confines said springs, said second spring having a first region abutting against the first region of said common spring and a second region located radially inwardly of the respective first region and abutting against said second cupped section.

32. The unit of claim 31, wherein said second section includes a radially inwardly extending portion constituting said abutment means and disposed intermediate said second spring and the pressure plates of said second clutch, the second region of said second spring abutting against said portion of said second section.

33. The unit of claim 23, further comprising a ring-shaped seat interposed between said common spring and said second spring, the axially movable pressure plate of said first clutch having an annulus of projections which are biased by the respective region of said common spring in engaged condition of the corresponding clutch.

34. The unit of claim 1, further comprising a rotary housing, said housing including a first section rigid with the axially fixed pressure plate of said first clutch and confining the friction disc and the axially movable pressure plate of said first clutch, and a second section rigid with said first section and at least partially confining said common spring.

35. The unit of claim 34, wherein the axially fixed pressure plate of said second clutch is connected with said second section.

36. The unit of claim 35, further comprising means for axially movably connecting the axially movable pressure plate of said second clutch with said second section.

37. The unit of claim 36, wherein said connecting means comprises leaf springs which hold the axially movable pressure plate of said second clutch against angular movement relative to said second section.

38. The unit of claim 36, wherein said connecting means is disposed between the axially fixed pressure plate of said second clutch and said second position.

39. The unit of claim 1, further comprising a second dished spring for biasing the axially movable pressure plate of said one clutch in engaged condition of such clutch and a housing including abutment means for said second spring, said housing further including a portion which constitutes said fulcrum and said common spring having a plurality of openings, said abutment means including components extending through the openings of said common spring and connected with said fulcrum.

40. The unit of claim 39, wherein each of said components includes spaced-apart first and second radially extending portions respectively engaging said fulcrum and said second spring and an axially extending portion disposed between the respective first and second portions and extending through an opening of said common spring.

41. The unit of claim 1, further comprising means for actuating said clutches, said actuating means including said common spring and further including means for moving a portion of said spring axially of said clutches so as to disengage said second clutch ahead of said first clutch and to engage said first clutch ahead of said second clutch.

42. The unit of claim 41, further comprising a crankshaft forming part of an internal combustion engine and arranged to transmit torque to the friction of said first clutch, and a second shaft forming part of a change-speed transmission and arranged to receive torque from the friction disc of said second clutch.

43. The unit of claim 42, further comprising a flywheel including at least one of said pressure plates.

* * * * *